United States Patent [19]

Nemechek

[11] 4,401,174

[45] Aug. 30, 1983

[54] WEIGH SCALE MACHINE HAVING SOLID-STATE CONTROLLER

[75] Inventor: Marshall E. Nemechek, Humboldt, Iowa

[73] Assignee: Douglas & Lomason Company, Farmington Hills, Mich.

[21] Appl. No.: 267,740

[22] Filed: May 28, 1981

[51] Int. Cl.³ ............................................ G01G 13/24
[52] U.S. Cl. .................................... 177/114; 177/122
[58] Field of Search ............... 177/114, 115, 116, 122, 177/123, 105–113, 50, 25

[56] References Cited

U.S. PATENT DOCUMENTS

| 2,022,659 | 12/1935 | Fisher | 177/113 X |
| 2,954,202 | 9/1960 | Bale | 177/122 X |
| 3,124,206 | 3/1964 | Burke | 177/116 X |
| 3,133,607 | 5/1964 | Gardner | 177/108 |
| 3,959,636 | 5/1976 | Johnson | 177/25 X |

Primary Examiner—Joseph W. Hartary
Attorney, Agent, or Firm—Harness, Dickey & Pierce

[57] ABSTRACT

A weigh scale machine for automatically filling bags/containers including an infeed chute, a weigh bucket, a scale mechanism, and a discharge hopper. Initially, the flow gate located between the infeed chute and the weigh bucket is open and product is permitted to flow through the infeed chute into the weigh bucket. When the prescribed weight is attained, as determined by the setting of the scale mechanism, a weigh complete sensor is triggered and the flow gate is closed. The dump doors located at the bottom of the weigh bucket are then opened and the product is discharged through the hopper into the bag/container. Operation of the machine is controlled by a solid-state controller which includes a plurality of sensors for monitoring the actual positions of the flow gate, scale beam, and dump doors. The controller is adapted to sequence the machine through the various functions in the weighing and filling cycle in response to feedback signals received from the sensors indicating that commanded functions have in fact been performed.

15 Claims, 4 Drawing Figures

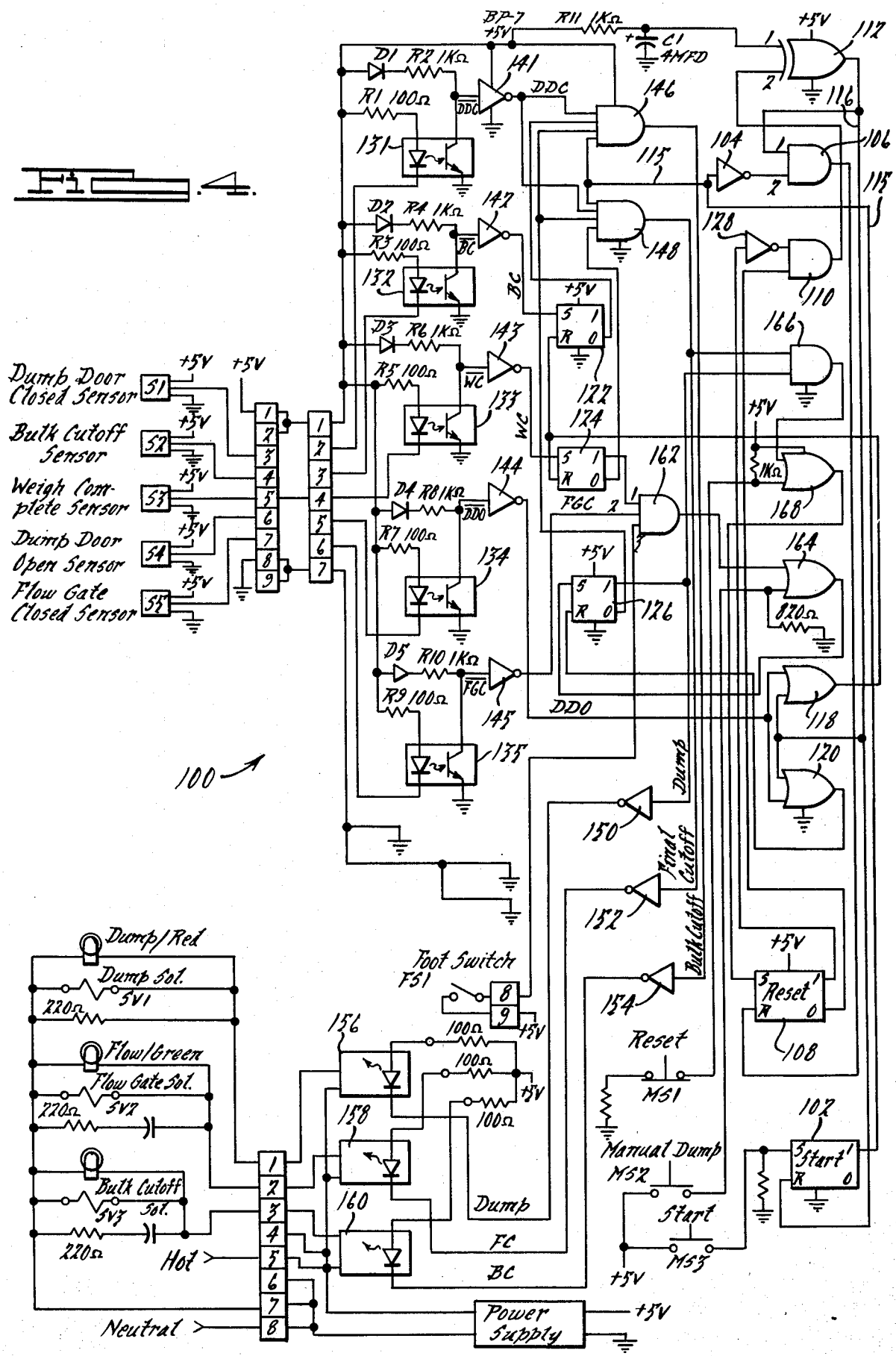

WEIGH SCALE MACHINE HAVING SOLID-STATE CONTROLLER

BACKGROUND AND SUMMARY OF THE INVENTION

The present invention relates to weigh scale machines and in particular to an improved solid-state controller for a weigh scale machine.

Weigh scale machines of the general type to which the present invention relates are utilized for packing various products into bags or other containers at relatively high speeds (e.g., 30 bags/containers per minute) and typically comprise an infeed chute, a scale mechanism, a weigh bucket, and a discharge chute. The flow of product from the infeed chute into the weigh bucket is controlled by an adjustable flow gate. The weigh bucket is operatively connected to the scale mechanism which determines when the weight of the product in the weigh bucket is equal to the desired fill weight. Product from the weigh bucket is then dumped through the discharge chute into the bag/container when the appropriate weight is attained.

In general, the control circuitry for such weigh scale machines typically comprises a plurality of contact relays which are arranged to sequentially control the various steps in the weighing and packing process. Sequencing of the machine is generally controlled by timers which establish a predetermined delay between the performance of each successive function. Typically, the only function that is actually monitored by a sensor is the "weigh complete" function which may, for example, be monitored by a limit switch that is triggered by the scale mechanism when the weight of the product in the weigh bucket attains the desired level. The disadvantage with the use of timers, however, is that it introduces a significant limitation on the speed at which the machine can operate, since the period of each timer invariably must be set to accommodate the worse condition. In addition, controllers of this type have no way of confirming that the particular function called for has actually been performed. Thus, for example, if the dump door should fail to fully open, thereby preventing all of the product in the weigh bucket from being dispensed into the bag/container within the allotted time, the machine will erroneously underfill each bag/container without detecting the fault condition.

Thus, it is the primary object of the present invention to provide an improved weigh scale machine having a solid-state controller that includes sensors for monitoring the positions of the flow gate, the dump door, and the scale beam.

In addition, it is an object of the present invention to provide an improved weigh scale machine that is highly accurate, reliable, and capable of operating at high rates of speed.

Moreover, it is a further object of the present invention to provide an improved weigh scale machine having means for varying the rate of flow of product from the infeed chute into the weigh bucket so that the feed rate can be set in accordance with the flow characteristics of the product.

The preferred embodiment of the weigh scale machine described herein includes an infeed chute for providing product to the weigh bucket via a cylinder operated flow gate. The position of the flow gate is controlled by one cylinder in the single-stage version of the machine, and by two cylinders in the two-stage version. In the two-stage version, both cylinders are actuated to completely open the flow gate for bulk flow. However, when product weight approaches the desired fill weight, the bulk flow cylinder is deactivated, thereby partially closing the flow gate and substantially diminishing the flow rate of product into the weigh bucket. The two-stage fill capability is therefore primarily utilized when working with a product having high flow characteristics to minimize the amount of airborne product after the flow gate is completely closed. The weigh bucket has two dump doors which are operated by a single cylinder for discharging the weighed product. The weigh bucket is pivotally mounted to one end of the scale beam which has an adjustable weight mechanism connected to its other end. The fill weight necessary to cause the bucket to move down is determined by adjusting the position of the weights in the weigh mechanism in a conventional manner.

The controller for the present weigh scale machine is comprised principally of digital logic circuitry for controlling the sequencing of the various machine functions. Five magnetically-responsive sensors are utilized to monitor the positions of the dump door, flow gate and scale beam, and provide feedback signals to the logic circuitry. The control logic sequences the machine through the various functions in the weighing and packing process in response to appropriate sensor signals. In addition, the control logic controls the energization of the dump door and flow gate solenoids which in turn control the activation of the pneumatic cylinders which operate the flow gate and dump door mechanisms.

By actually monitoring the positions of the flow gate, dump door, and scale beam, the present controller is capable of optimizing the cycle time of the machine, within the limitations imposed by the flow characteristics of the product. In addition, since the controller waits for confirmation from the appropriate sensor that a commanded function has actually been performed before proceeding to the next step in the process, mechanical failures or malfunctions are almost immediately detected by the controller, thereby significantly reducing the likelihood that an appreciable number of erroneously packaged bags/containers might be processed before the fault condition is detected.

Additional objects and advantages of the present invention will become apparent from a reading of the detailed description of the preferred embodiment which makes reference to the following set of drawings in which:

BRIEF DESCRIPTION OF THE DRAWINGS

FIG. 4 is a schematic circuit diagram of the electronic solid-state controller of the weigh scale machine according to the present invention.

DETAILED DESCRIPTION OF THE PREFERRED EMBODIMENT

Figure 1:
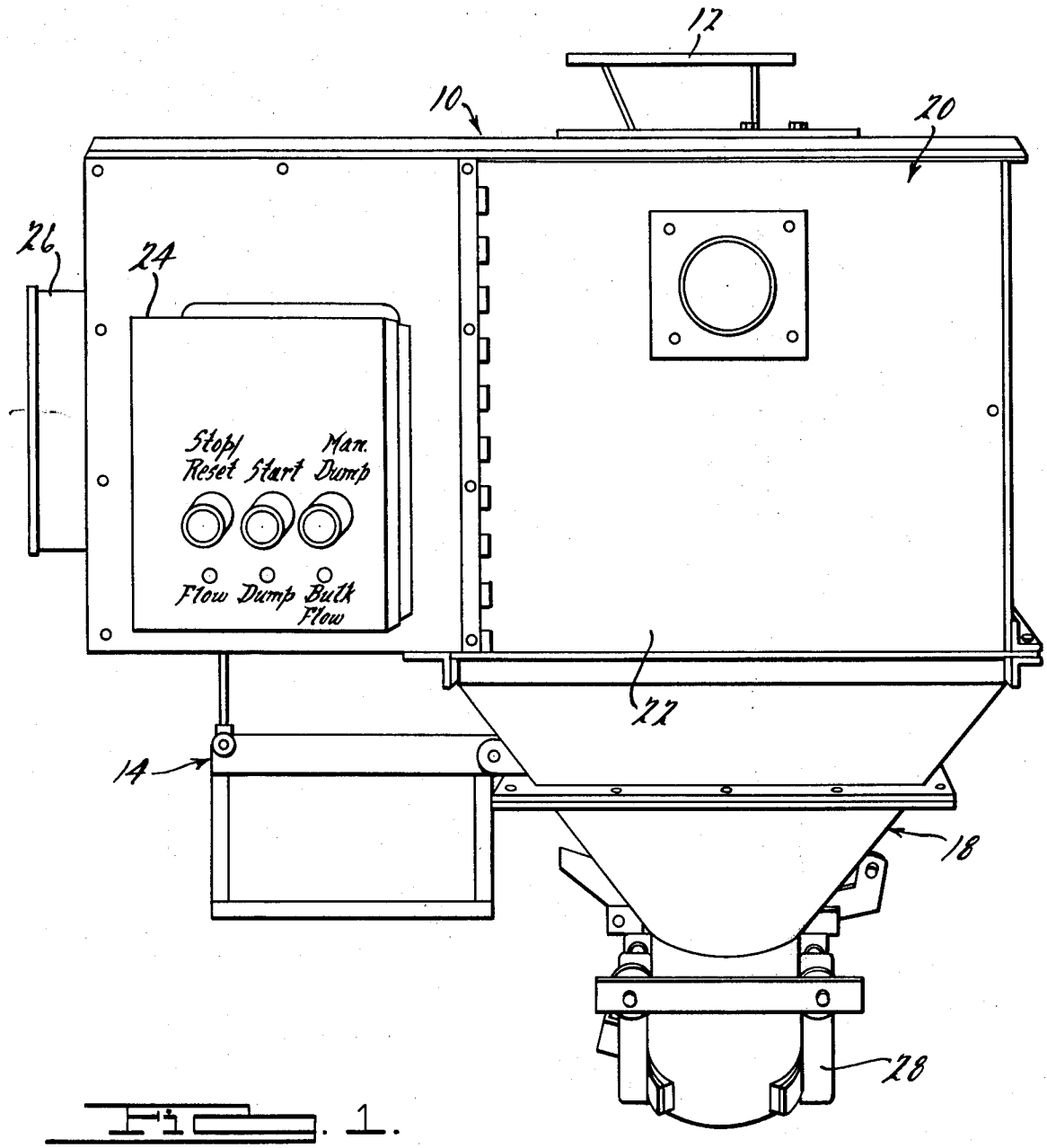
FIG. 1 is a side elevational view of a weigh scale machine according to the present invention.
Figure 2:
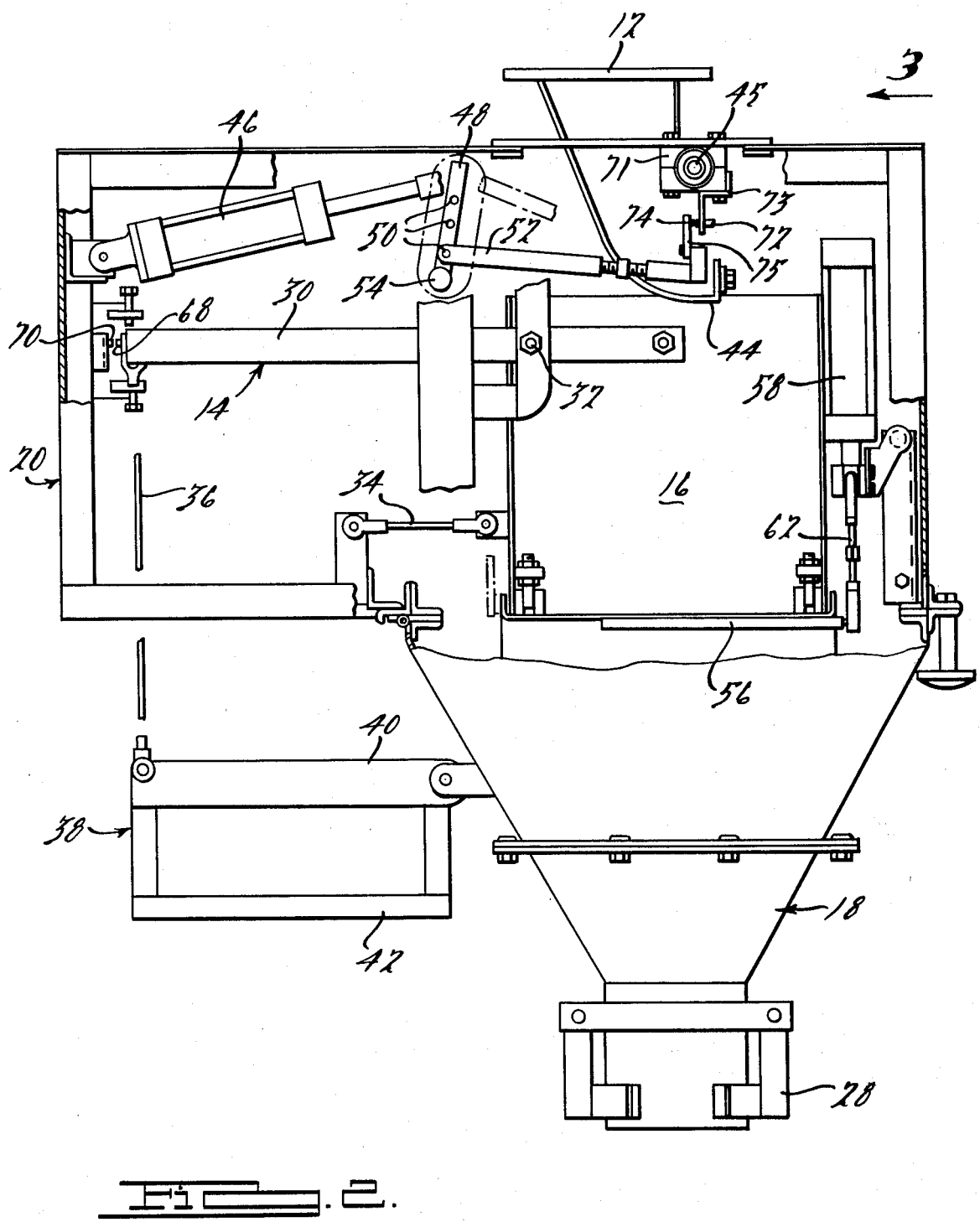
FIG. 2 is a side elevational view of the weigh scale machine of FIG. 1 with the exterior cabinetry removed to expose the mechanical components of the machine.
Figure 3:
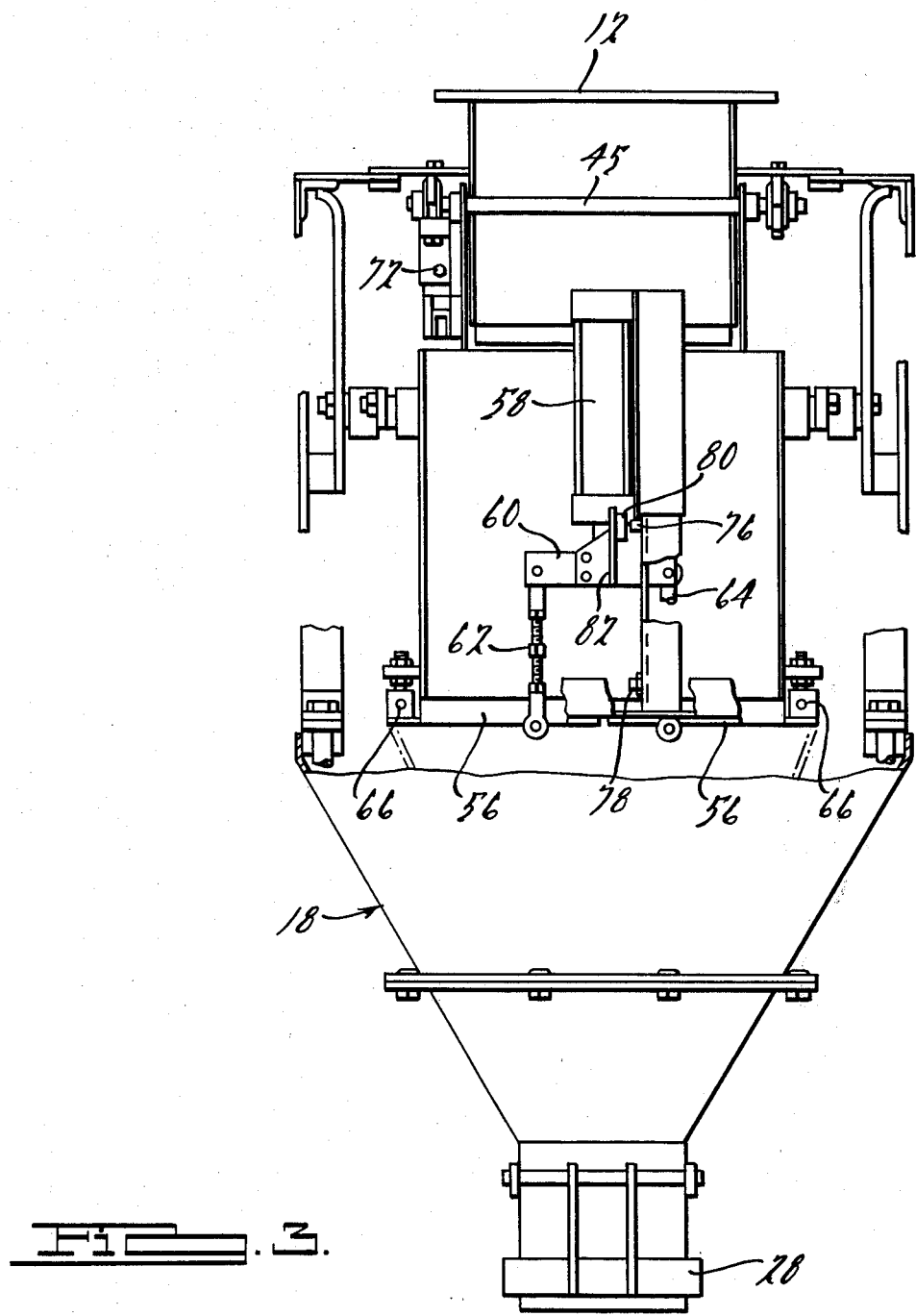
FIG. 3 is another side view of the weigh scale machine shown in FIG. 2 viewing the machine from the direction indicated by the arrow labeled "3"

Referring to FIGS. 1-3, a weigh scale machine 10 according to the present invention is shown. In general, the machine 10 comprises an infeed chute 12, a scale mechanism 14, a weigh bucket 16, and a discharge hopper 18. The mechanicals of the machine 10 are preferably enclosed within a cabinet 20 which serves not only to support the working parts of the machine, but also to contain any dust that is created during operation of the machine 10. The cabinet 20 includes hinged doors 22 which permit easy access to the working parts of the machine for cleaning and maintenance purposes.

A pair of control boxes 24 and 26 containing the electronic control circuitry of the present invention, are mounted to the exterior of the cabinet 20. Exposed on the facing of control box 24 are three control buttons, a stop/reset button, a start button, and a manual dump button, whose functions will be subsequently described. Located below the control buttons are three indicator lights, labelled "Flow", "Dump", and "Bulk Flow", which provide a visual indication whenever the corresponding pneumatic cylinders are energized.

The particular weigh scale machine 10 disclosed herein is adapted to fill a bag-type container, which is secured to the bottom of the discharge hopper 18 by a pair of pneumatically controlled clamps 28 which are manually actuated by a foot switch, as will subsequently be described.

The scale mechanism 14 comprises a scale beam 30 which has pivotally connected thereto at one end the weigh bucket 16. The weigh bucket 16 therefore comprises part of the scale mechanism. The scale beam 30 is pivoted at 32 so as to provide a 3:1 ratio relative to the weigh bucket 16. A check link 34 is pivotally connected at one end to the weigh bucket 16 and at its other end to the cabinet frame 20 to prevent the weigh bucket from swaying. A link pin 36, also pivoted at both ends, is connected between the end of the scale beam 30 opposite the weigh bucket 16 and a double bar structure 38 comprising a large bar 40 for supporting a large slide weight and a small bar 42 for supporting a small trim weight. Thus, as is conventional, by sliding the weights to various positions on the bars 40 and 42, the amount of weight in weigh bucket 16 necessary to move the scale beam 30 upwardly and the weigh bucket 16 downwardly, is determined.

Product is fed through the infeed chute 12 and into the weigh bucket 16 under the control of a flow gate 44 which is rotatably mounted to shaft 45 and whose position is controlled by a pneumatic cylinder 46. The flow gate cylinder 46 is pivotally anchored to the cabinet frame 20 and has its piston rod connected to a pivot link 48. Pivot link 48, which is pivoted about axis 54, also has connected thereto a connecting link 52 which is secured at its other end to the flow gate 44. Significantly, it will be noted that pivot link 48 contains a plurality of holes 50 to which connecting rod 52 may be fastened. Thus, it will be appreciated that by changing the point at which connecting rod 52 is fastened to pivoting link 48, the amount by which flow gate 44 is opened when cylinder 48 is activated is varied. The ability to adjust the opening of flow gate 44 provides the weight scale machine of the present invention with the capability of setting the flow gate opening in accordance with the flow characteristics of the product.

Product is discharged from the weigh bucket 16 through a pair of dump doors 56 which are actuated by a single air cylinder 58. With particular reference to FIG. 3, the air cylinder 58 is connected to a cross member 60 which in turn has pivotally connected to its opposite ends a pair of connecting links 62 and 64 which are pivotally connected at their other ends to the dump door 56. The dump doors 56 are hinged along their outer edges at 66, so that when the dump door cylinder 58 is actuated and cross member 60 is moved downwardly, the two connecting links 62 and 64 will pivot outwardly to swing the dump doors 46 to their open vertical position.

The controller of the present invention monitors the positions of the flow gate, scale beam, and dump doors, utilizing a plurality of sensors which in the preferred embodiment comprise magnetically responsive Hall-effect devices. With particular reference to FIG. 2, the position of the scale beam 30 is monitored by a "weigh complete" sensor 70 which is mounted to the sidewall of the cabinet 20. A permanent magnet 68 is fastened to the adjacent end of scale beam 30. Accordingly, when the weight of the product in the weigh bucket 16 attains the preset weight, as determined by the setting of the weights on bars 40 and 42, the magnet 68 will move adjacent to sensor 70 as the scale beam rises, thereby activating the sensor 70 and providing a signal to the controller indicating that the product weigh in the weigh bucket 16 attains the desired weight.

The position of the flow gate 44 is monitored by a flow gate sensor 72 which is mounted to a bracket 73 depending from the journal support 71 for shaft 45. A permanent magnet 74 is similarly mounted to a bracket 74 fastened to the end of connecting rod 52 so that when the flow gate 44 is closed, as shown in FIG. 2, magnet 74 will be positioned in close proximity to sensor 72, thereby activating sensor 72 to provide a signal to the controller indicating that the flow gate is closed.

With particular reference to FIG. 3, the position of the dump doors 56 is monitored by a pair of sensors, one for detecting when the dump doors are closed (DDC 76) and one for detecting when the dump doors are open (DDO 78). Both dump door sensors 76 and 78 are triggered by a permanent magnet 80 which is mounted to a bracket 82 affixed to cross member 60. When the dump doors 56 are closed, magnet 80 is positioned as shown in FIG. 3 adjacent sensors 76, thereby activating the sensor 76 and providing a signal to the controller indicating that the dump doors 56 are closed. Similarly, when the dump door cylinder 58 is actuated and the cross member 60 and bracket 82 are moved downwardly, magnet 80 will become positioned adjacent sensor 78 when the dump doors 56 are completely opened, thereby activating sensor 78 and providing a signal to the controller indicating that the dump doors 56 are open.

In operation, both the flow gate 44 and dump doors 56 are initially closed. Cylinder 46 is then actuated to open flow gate 44 and product is fed from infeed chute 12 into weigh bucket 16. When the weight of the product in weigh bucket 16 attains the desired weight as established by the positioning of the weights on bars 40 and 42, the weigh bucket 16 will lower and the scale beam 30 will rise until the magnet 68 at the end of beam 30 triggers the weigh complete sensor 70. When this occurs, the air cylinder 46 is de-activated and the flow gate 44 is closed. When magnet 74 triggers the flow gate sensor 72, the dump door air cylinder 48 is activated and the dump doors 56 are opened, thereby discharging the product from the weigh bucket 16, through the discharge hopper 18 and into the bag secured to the bottom of the funnel. As will subsequently be seen, the dump door cylinder 58 is actuated to open the dump doors 56 at this point in the cycle only if the operator has previously activated the foot switch to indicate that a bag has been properly secured to the bottom of the hopper 28. When magnet 80 triggers the dump doors open sensor 78, air cylinder 58 is de-activated and the dump doors 56 are closed. Finally, when magnet 80 triggers the dump doors closed sensor 76, the flow gate cylinder 46 is again actuated to open the flow gate 44 and the process is repeated. Significantly, it will be appreciated that the use of the sensors to monitor the positions of the flow gate 44 and dump doors 56 insures that the flow gate 44 and dump doors 56 are not erroneously both open at the same time.

Referring to FIG. 4, a circuit diagram of a controller 100 for the weigh scale machine of the present invention is shown. Upon the initial application of power to the system, the controller 100 is adapted to automatically initialize itself by resetting the various flip-flops in the circuit. This is accomplished in the following manner. At the outset, both the "1" and "0" outputs of RESET flip-flop 108 are LO, thus providing a LO input signal at pin 2 of exclusive-OR gate 112 through AND gate 110. The other input (pin 1) of exclusive-OR gate 112 is connected to the +5 volts supply line 114 through an RC timing network comprised of resistor R11 and capacitor C1. Initially, as capacitor C1 is charging, the signal at input pin 1 of exclusive-OR gate 112 is also LO, thus providing a LO signal at its output on line 116. However, after a delay of approximately four milliseconds, the signal at pin 1 of exclusive-OR gate 112 will become digitally HI, thereby placing a HI signal at its output on line 116. The HI signal on line 116 is provided to the reset terminal of START flip-flop 102 to reset the flip-flop and also to the inputs of a pair of OR gates 118 and 120. The outputs of both OR gates 118 and 120, which are connected to the reset inputs of flip-flops 122, 124 and 126, are thus forced HI, thereby resetting the flip-flops 122, 124 and 126. In addition, with the START flip-flop 102 in its reset state, the signal at its "1" output on line 115 will be LO, which in turn places a HI signal at input pin 2 of AND gate 106 through inverter 104. Thus, coupled with the HI signal at input pin 1 of AND gate 106 from line 116, the output of AND gate 106 will go HI, thereby resetting RESET flip-flop 108. With RESET flip-flop 108 in the reset condition, its "1" output will go LO and its "0" output will go HI, which places a pair of HI signals, via inverter 128, at the two inputs of AND gate 110. The output of AND gate 110 accordingly will go HI, thus providing a HI signal at input pin 2 of exclusive-OR gate 112, which together with the HI signal now present at input pin 1 thereof, causes the output of exclusive-OR gate 112 to go LO, thus terminating the brief reset pulse produced on line 116.

With the controller 100 initialized, the machine is started by depressing the START button MS3, which serves to set START flip-flop 102 and place a HI signal at its "1" output on line 115. The HI signal on line 115 is inverted by inverter 104, thus providing a LO signal to input pin 2 of AND gate 106 and thereby causing its output to go LO to terminate the reset signal provided to the reset terminal of RESET flip-flop 108.

With the machine started, the controller 100 functions in the following manner. Initially, both the dump door and flow gate are closed. Accordingly, the dump door closed (DDC) sensor S1 and flow gate closed (FGC) sensor S5 are closed. Similarly, the weigh complete (WC) sensor S3 and dump door open (DDO) sensor S4 are open. The bulk cutoff (BC) sensor S2, which is not shown in the drawings in FIGS. 1-3, is alternatively included with the machine if a two-stage filling operation is desired. In particular, the additional bulk cutoff sensor S2 is intended to be positioned so that the scale beam will activate the sensor when the contents of the weigh bucket attain a predetermined percentage of the final fill weight. The sensor S2 then activates another flow gate solenoid to partially close the flow gate to reduce the flow rate of product into the weigh bucket. Since the inclusion of the bulk cutoff sensor S2 merely adds an intermediary step in the control process, the following description will assume that the weigh machine includes the bulk cutoff sensor.

Each of the five sensors S1-S5 is connected to the controller 100 through an optical coupler, 131-135 respectively, consisting of a light emitting diode (LED) and phototransistor pair. The output from each optical coupler is then inverted by an inverter, 141-145 respectively. Taking the DDS sensor S1 as an example, when the sensor is activated, a direct current path is provided from supply line 114, through resistor R1 and the LED in optical coupler 131 to ground, thereby energizing the LED. The light emitted by the LED renders the phototransistor conductive which pulls the output of the optical coupler 131 off the collector of the phototransistor to ground. The LO digital signal is then inverted by inverter 141, thus resulting in a HI logic signal at the output of inverter 141. The remaining four sensors S2-S5 and their associated optical couplers 132-135 are designed to operate in the same manner. Accordingly, it will be appreciated that whenever one of the five sensors S1-S5 is activated, a HI signal will be produced at the output of the corresponding inverter, 141-145 respectively.

As noted previously, when the START pushbutton is depressed, the START flip-flop 102 is set and a HI signal is produced on line 115 which is provided to one of the inputs of a pair of 4-input AND gates 146 and 148. The remaining three inputs of AND gate 146 are connected to the DDC signal at the output of inverter 141 and to the "0" outputs of flip-flops 122 and 126. Similarly the three remaining inputs of AND gate 148 are connected to the DDC signal and to the "0" outputs of flip-flops 124 and 126. Thus, since the remaining three inputs of both AND gates 146 and 148 are also HI, due to the fact that the dump door is closed and the flip-flops 122, 124 and 126 are in their reset state as a result of the automatic reset condition generated when power was initially applied, the outputs of both AND gates 146 and 148 will go HI. The HI output signals from AND gates 146 and 148 are inverted by inverters 152 and 154, thereby enabling the flow gate solenoid SV2 and bulk cutoff solenoid SV3 via optical couplers 158 and 160, respectively. Accordingly, the flow gate will completely open, permitting product to fall into the weigh bucket.

As the bucket is filled with product and its weight approaches the desired fill weight, the scale beam will begin to move. When the weight of the bucket attains a predetermined percentage of the desired fill weight, the magnet attached to the scale beam will activate the bulk cutoff sensor S2, thereby setting flip-flop 122. The "0" output of flip-flop 122 will accordingly go LO, causing the output of AND gate 146 to go LO, which in turn de-activates the bulk cutoff solenoid SV3 to partially close the flow gate and reduce the rate of flow of product into the weigh bucket. Product will continue to flow into the weigh bucket at a substantially reduced rate until the desired fill weight is attained, at which point the magnet attached to the scale beam will activate the weigh complete sensor S3. The activated WC sensor S3 places a HI signal at the set input of flip-flop 124, thereby setting the flip-flop and causing its "0" output to go LO. The LO signal from the "0" output of flip-flop 124 in turn causes the output of AND gate 148 to go LO, which de-activates the flow gate solenoid SV2 to close the flow gate and halt the flow of product into the weigh bucket. When the flow gate is completely closed, the flow gate sensor S5 is activated, placing a HI signal at input pin 2 of a 3-input AND gate 162. The signal at input pin 1 of AND gate 162 is also HI, since flip-flop 124 was previously set by the activation of the weigh complete sensor S3. Input pin 3 of AND gate 162 is connected to a manually actuable foot switch FS1, which is adapted to be actuated by the operator when the bag has been properly attached to the bottom of the discharge chute. Alternatively, it will be appreciated that the foot switch FS1 could be replaced by a microswitch that is connected to the bag clamps and is automatically activated when the bag clamps are closed.

When the foot switch FS1 is closed, indicating that the bag is properly in place, all three inputs of AND gate 162 are HI, thereby forcing the output of AND gate HI. The HI output from AND gate 162 is provided to the input of an OR gate 164, causing its output to go HI and set flip-flop 126. The "1" output of flip-flop 126 is thus set HI, which is inverted by inverter 150 to enable the dump solenoid SV1 via optical coupler 156. The dump door, accordingly, will open and the product from the weigh bucket will immediately fall through the discharge chute into the bag. When the dump door is completely opened, the DDO sensor S4 is activated, placing a HI signal at the output of inverter 144 which is provided to the inputs of OR gates 118 and 120. The outputs of both OR gates are thus forced HI, thereby resetting flip-flops 122, 124 and 126, and restoring the HI signals at the inputs of AND gates 146 and 148. In addition, when flip-flop 126 is reset, the "1" output of the flip-flop goes LO, deactivating the dump solenoid SV1 to close the dump door. When the dump door is completely closed, the DDC sensor S1 is again activated and the HI signal at the output of inverter 141 is returned to the inputs of AND gates 146 and 148, thus preparing the controller 100 to repeat the above process for the next weigh cycle.

In addition, it will be noted that the preferred embodiment of the controller 100 includes a manual reset capability which is adapted to stop the machine and place the controller in the initialized condition described above when power is initially applied to the system. Specifically, when the normally-closed RESET button MS1 is opened, a HI signal is provided to the input of OR gate 168, which causes its output to go HI and set RESET flip-flop 108. With the "1" output of RESET flip-flop 108 HI and its "0" output LO, the output of AND gate 110 is switched LO, thereby placing a LO signal at the pin 2 input of exclusive-OR gate 112. With input pin 1 of exclusive-OR gate HI, a HI reset pulse is produced at its output on line 116. The HI reset pulse on line 116 causes the outputs of OR gates 118 and 120 to both go HI and reset flip-flops 122, 124 and 126. In addition, the START flip-flop 102 is reset, forcing its "1" output on line 115 to go LO. The LO signal on line 115 is then inverted by inverter 104 and provided to the pin 2 input of AND gate 106. Since the pin 1 input of AND gate 106 is also HI due to the HI reset signal on line 116, the output of AND gate 106 is switched HI, thereby resetting RESET flip-flop 108. With RESET flip-flop 108 in its reset condition, the output of AND gate 110 reverts to a HI state, thereby placing two HI signals at the inputs of exclusive-OR gate 112 and terminating the HI reset pulse at its output on line 116. The START button MS3 must then be reactuated to begin a new weigh cycle.

Also included in the present controller 100 is a manual dump capability which provides the operator with the ability to manually activate the dump solenoid SV1 to open the dump door. In particular, when the normally-open manual dump switch MS2 is depressed, a HI signal is provided to the input of OR gate 164, thereby causing its output to go HI and set flip-flop 126. With flip-flop 126 set, a HI signal is on the "1" output of the flip-flop which is then inverted by inverter 150 to enable the dump solenoid SV1 via optical coupler 156. When activated manually, the dump door will remain open until the system is reset by depressing the RESET button MS1.

Finally, it will be noted that a fault detection circuit is included in the preferred embodiment of the controller 100 which is adapted to detect whenever the flow gate and dump door are both open at the same time. It will be recalled that the output of AND gate 148 is HI whenever the flow gate solenoid SV2 which opens the flow gate is activated and the flip-flop 126 is set whenever the dump solenoid SV1 which opens the dump door is activated. The output signal from AND gate 148 together with the "1" output of flip-flop 126 are both provided to the inputs of an AND gate 166 which has its output connected to the input of OR gate 168. Thus, if both inputs of AND gate 166 are HI at the same time causing the output of AND gate 166 to go HI, the output of OR gate 168 will similarly be forced HI, thereby setting the RESET flip-flop 108, which as previously described, results in the resetting of flip-flops 122, 124 and 126, as well as START flip-flop 102. If such a condition occurs, the system cannot be restarted without again actuating the START button MS3.

While the above description constitutes the preferred embodiment of the present invention, it will be appreciated that the invention is susceptible to modification, variation and change without departing from the proper scope or fair meaning of the accompanying claims.

What is claimed is:

1. In an automated weigh scale machine having an infeed chute, a weigh bucket, a flow gate for controlling product flow from the infeed chute into the weigh bucket and first actuating means for controlling the position of the flow gate, a scale mechanism for weighing the product in the weigh bucket, and a dump door for dispensing product from the weigh bucket into a container and second actuating means for controlling the position of the dump door; control means for controlling the operation of the weigh scale machine comprising:

first sensing means for monitoring the position of said flow gate;

second sensing means for monitoring said scale mechanism and producing a weigh signal when the weight of the product in said weigh bucket equals a predetermined desired product weight;

third sensing means for monitoring the position of said dump door sensing when said dump door is fully open;

fourth sensing means for monitoring the position of said dump door sensing when said dump door is closed;

first semiconductor bistable means alterable between first and second states and responsive to said first sensing means for providing a dump door control signal;

second semiconductor bistable means alterable from a first state to a second state in response to said weigh signal;

first logic gating means responsive to said first and second bistable means and to said fourth sensing means for providing a flow gate control signal causing said first actuating means to open said flow gate when said dump door is closed and said first and second bistable means are in said respective first states and to close said flow gate when said second bistable means is in said second state;

second logic gating means responsive to said second bistable means and to said first sensing means for switching said first bistable means from said first state to said second state when said flow gate is closed and said second bistable means is in said second state;

said second actuating means responsive to said dump door control signal to open said dump door when said first bistable means is in said second state and to close said dump door when said first bistable means is in said first state;

third logic gating means responsive to said third sensing means for switching said first and second bistable means to said respective first states when said dump door is fully open; and fault detection means for detecting when said flow gate and said dump door are both open at the same time and for providing a fault indication.

2. The apparatus of claim 1 further comprising fifth sensing means for monitoring said scale mechanism and producing a second weigh signal when the weight of the product in said weigh bucket equals a predetermined percentage of said desired product weight.

3. The apparatus of claim 2 further comprising third semiconductor bistable means alterable from a first state to a second state in response to said second weigh signal, and wherein said first actuating means is responsive to said third bistable means to partially close said flow gate when said third bistable means is in said second state.

4. The apparatus of claim 3 further comprising third logic gating means responsive to said first and third bistable means and to said fourth sensing means for providing a bulk cutoff control signal causing said first actuating means to partially close said flow gate.

5. The apparatus of claim 9 further comprising resetting means for placing said first and second bistable means in said respective first states.

6. The apparatus of claim 3 further comprising resetting means for placing said first, second and third bistable means in said respective first states.

7. The apparatus of claim 6 wherein said resetting means produces a reset signal and includes timing means for terminating said reset signal after a predetermined time interval.

8. The apparatus of claim 1 further comprising means for indicating that said container is positioned to receive said product dispensing from said weigh bucket and for providing an indication signal, wherein said second logic gating means is responsive to said indicating means.

9. The apparatus of claim 8 wherein said second logic gating means is responsive to said indicating means to switch said first bistable means from said first state to said second state in response to said indication signal when said flow gate is closed, and said second bistable means is in said second state.

10. The apparatus of claim 8 wherein said indicating means includes foot switch means.

11. The apparatus of claim 1 wherein said fault detection means comprises fourth logic gating means responsive to said first logic gating means and to said first bistable means for providing said fault indication.

12. The apparatus of claim 1 further comprising resetting means responsive to said fault indication for placing said first and second bistable means in said respective first states.

13. The apparatus of claim 1 wherein said first actuating means includes means for selectably adjusting the degree to which said flow gate will open.

14. In an automated weigh scale machine having an infeed chute, a weigh bucket, a flow gate for controlling product flow from the infeed chute into the weigh bucket, and first actuating means for controlling the position of the flow gate, a scale mechanism for weighing the product in the weigh bucket, and a dump door for dispensing product from the weigh bucket into a container and second actuating means for controlling the position of the dump door; control means for controlling the operation of the weigh scale machine comprising:

dump door control means comprising first proximity sensing means for monitoring the position of said flow gate providing a first proximity signal, first AND gate means having first, second and third input terminals and an output terminal providing a first logic signal, the second input terminal of said first AND gate means being responsive to said first proximity signal, a first flip flop having a set input terminal responsive to said first logic signal, a reset input terminal and a pair of output terminals, one of said pair of output terminals providing dump door control signal for controlling said second actuating means to open said dump door;

flow gate control means comprising second proximity sensing means for monitoring said scale mechanism and producing a weigh signal when the weight of the product in said weigh bucket equals a predetermined desired product weight, third proximity sensing means for monitoring the position of said dump door sensing when said dump door is fully open, a second flip flop having a set terminal responsive to said weigh signal, a reset input terminal and a pair of output terminals, one of said pair of output terminals being coupled to said first input terminal of said first AND gate means, second AND gate means having first, second, and third input terminals and an output terminal providing a flow gate cut off signal for controlling said first actuating means, the first input terminal of said second AND gate means being responsive to said third proximity sensing means, the second input terminal of said second AND gate means being responsive to the other of said pair of output terminals of said first flip flop, and the third input terminal of said second AND gate means being responsive to the other of said pair of output terminals of said second flip flop;

reset control means comprising first pulse generating means comprising energy storage means coupled through impedence means to a source of electrical energy for providing a delayed logical timing signal, third flip flop having set and reset input terminals and an output terminal, exclusive OR gate means having a first input terminal receptive of said delayed logical timing signal and a second input terminal responsive to said output terminal of said third flip flop and having an output terminal, first OR gate means having first and second input terminals and an output terminal providing reset signal to said reset terminals of said first and second flip flops, the first input terminal of said first OR gate being responsive to said third proximity sensing means and the second input terminal of said first OR gate being responsive to the output terminal of said exclusive OR gate.

15. The apparatus according to claim 14 further comprising first optical coupling means for isolating said first proximity sensing means from said first flip flop, second optical coupling means for isolating said second proximity sensing means from said second flip flop, third optical coupling means for isolating said third proximity sensing means from said first OR gate means, fourth optical coupling means for isolating said fourth proximity sensing means from said second AND gate means, fifth optical coupling means for isolating said first actuating means from said second AND gate means, and sixth optical coupling means for isolating said second actuating means from said first flip flop.

* * * * *

UNITED STATES PATENT AND TRADEMARK OFFICE
CERTIFICATE OF CORRECTION

PATENT NO. : 4,401,174

DATED : August 30, 1983

INVENTOR(S) : Marshall E. Nemechek

It is certified that error appears in the above-identified patent and that said Letters Patent is hereby corrected as shown below:

Column 9, line 61, Claim 5, "9" should be --1--.

Signed and Sealed this

Twenty-ninth Day of November 1983

[SEAL]

Attest:

GERALD J. MOSSINGHOFF

Attesting Officer   Commissioner of Patents and Trademarks